United States Patent [19]

Piers et al.

[11] Patent Number: 5,599,752
[45] Date of Patent: Feb. 4, 1997

[54] GLASS FOR A CONE OF A DISPLAY TUBE, DISPLAY TUBE ENVELOPE COMPRISING A CONE OF SUCH A GLASS AND METHOD OF MANUFACTURING A CONE FROM SUCH A GLASS

[75] Inventors: Andreas J. Piers, Bladel; Jan G. J. Peelen, Eindhoven, both of Netherlands

[73] Assignee: U.S. Philips Corporation, New York, N.Y.

[21] Appl. No.: 352,412

[22] Filed: Dec. 8, 1994

[30] Foreign Application Priority Data

Dec. 8, 1993 [BE] Belgium ............................... 09301352

[51] Int. Cl.$^6$ ................................................... C03C 3/105
[52] U.S. Cl. ............................................. 501/62; 501/155
[58] Field of Search ................................. 501/62, 155

[56] References Cited

U.S. PATENT DOCUMENTS

| | | | |
|---|---|---|---|
| 2,388,866 | 11/1945 | Partridge | 501/62 |
| 2,692,833 | 10/1954 | Armistead | 501/61 |
| 3,464,932 | 9/1969 | Connelly et al. | 501/62 |
| 3,672,919 | 6/1972 | Sack | 501/62 |
| 4,174,490 | 10/1979 | Van Erk et al. | 313/480 |
| 4,520,115 | 5/1985 | Speit et al. | 501/62 |
| 4,680,503 | 7/1987 | Spierings et al. | 501/62 |

FOREIGN PATENT DOCUMENTS

| | | |
|---|---|---|
| 0525226 | 2/1993 | European Pat. Off. . |
| 0538568 | 4/1993 | European Pat. Off. . |
| 2358648 | 6/1975 | Germany . |

OTHER PUBLICATIONS

Chemical Abstract, vol. 87., No. 22, 28 Nov. 1977, abstract JP-A-52 068 219, 6 Jun. 1977.
Chemical Abstrace, vol. 82, No. 18, 5 May 1975, abstract JP-A-49 026 051, 5 Jul. 1974.

Primary Examiner—Mark L. Bell
Assistant Examiner—Louis M. Troilo
Attorney, Agent, or Firm—Norman Spain

[57] ABSTRACT

The invention comprises a novel type of glass for a cone (3) of a display tube envelope (1), said glass being manufactured by recycling screen glass and cone glass of display tube envelopes. A mixture of screen and cone glasses is supplemented with other glass-forming components to form a novel glass composition which can be used in cone glass applications. The glass is characterized by a relatively high BaO and SrO content. The glass has an x-ray absorption $\mu$ of at least 65 cm$^{-1}$ at 0.6 Å.

3 Claims, 1 Drawing Sheet

U.S. Patent
Feb. 4, 1997
5,599,752
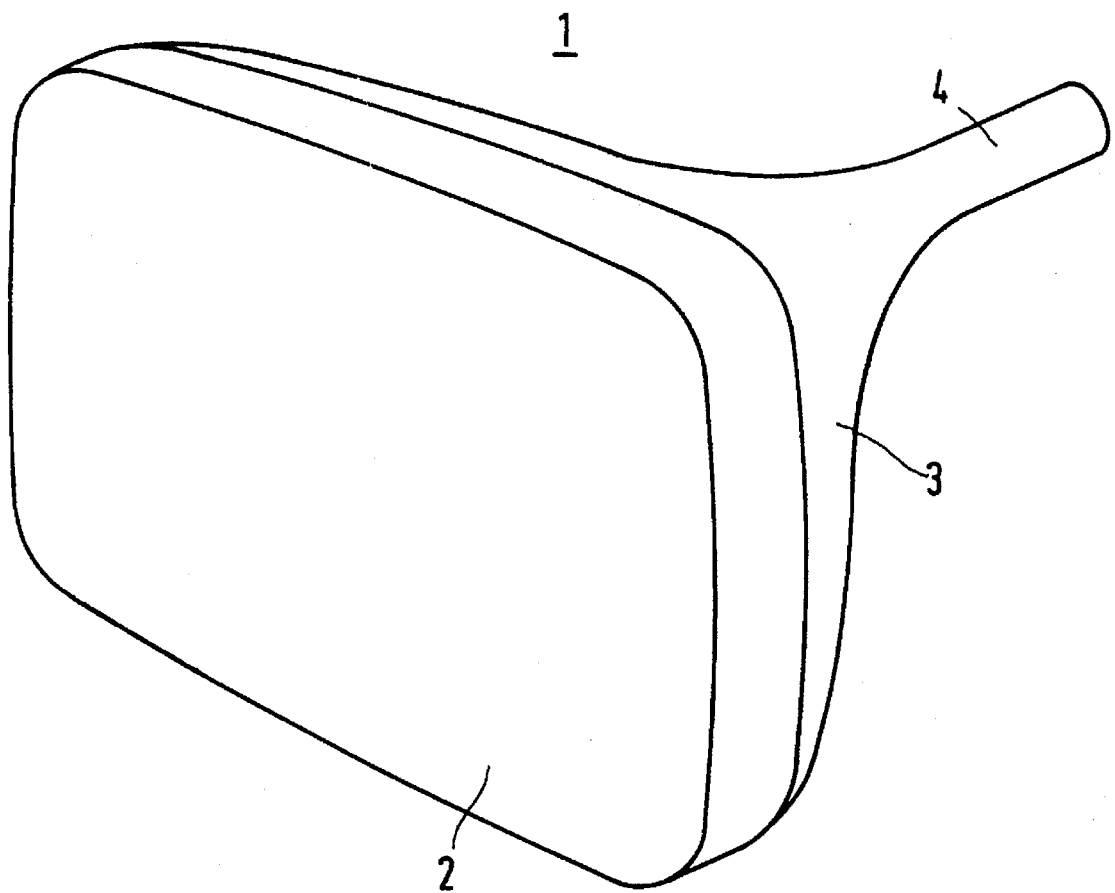

GLASS FOR A CONE OF A DISPLAY TUBE, DISPLAY TUBE ENVELOPE COMPRISING A CONE OF SUCH A GLASS AND METHOD OF MANUFACTURING A CONE FROM SUCH A GLASS

BACKGROUND OF THE INVENTION

The invention relates to a glass for a cone of a display tube.

The invention also relates to a cone and a display tube envelope whose cone is made from such a glass.

The invention further relates to a method of manufacturing cone glass and to a method of manufacturing a cone from such a glass.

Display tubes, such as display tubes for TV receivers and computer monitors, have an evacuated glass envelope which is built up of a screen, a cone and a neck. The neck is the part of the envelope which contains one or more electron guns. The screen contains, inter alia, one or more luminescent substances (phosphors). The cone is the funnel-shaped portion of the display tube. These three parts have different glass compositions whose physical properties are adapted to each other. Examples of important physical properties are: melting temperature, thermal expansion coefficient, x-ray absorption and electrical resistivity. The screen and the cone are manufactured by pressing a molten glass mixture and are sealed together by means of a sealing glass. The display tube operates under a high voltage (for example 25 kV) and generates X-radiation as a result of the electron bombardment on the glass and on the shadow mask in front of the screen.

Glasses for screens of display tubes must meet, inter alia, the following requirements: a high x-ray absorption, no discoloration as a result of electron radiation and x-radiation and a satisfactory meltability and processability. Said glasses preferably contain no or little PbO in order to suppress discoloration as a result of electron radiation. To obtain the desired x-ray absorption, said screen glass comprises 5–13 wt % BaO and 5–13 wt % SrO and, optionally, several percent $ZrO_2$.

The cone glass must meet, inter alia, the following requirements: a high x-ray absorption, a high electrical resistivity and a satisfactory meltability and processability. Discoloration as a result of electron radiation is to be minimized. Since the wall thickness of the cone is smaller than the wall thickness of the screen, the x-ray absorption coefficient $\mu$ (expressed in $cm^{-1}$ at a wavelength of 0.6 Å) of cone glass must be higher than that of screen glass. In the current cone glass, $\mu$ has a value $\geq 65$ $cm^{-1}$ (at 0.6 Å). This high $\mu$-value is attained by a high concentration of PbO in the cone glass. At equal concentrations of PbO and SrO, the x-ray absorption effectiveness of PbO is 1.5 times that of SrO. In a typical example, the current cone glass comprises approximately 23 wt % PbO. Since the raw material is very expensive, the current cone glass comprises very little SrO and the sum of BaO+SrO is approximately 1.5 wt %.

As the wall thickness of the neck is thinner than that of the cone, neck glass should have an even higher $\mu$ value, namely $\mu \geq 100$ $cm^{-1}$ (at 0.6 Å). This is attained by means of an even higher concentration of PbO, namely 30–35 wt %. The neck is manufactured from drawn glass tubing.

Future government measures will compel manufacturers of TV receivers and monitors to take back and recycle devices at the end of their lifetime. In this manner, the amount of waste and hence the space occupied by it at rubbish dumps is reduced. In addition, raw materials and energy can be saved. The glass display tube of the TV receivers to be recycled is the component with the highest weight, namely up to approximately 20 kg. It appears from the foregoing that the components of the display tube have different glass compositions. This complicates the recycling process of the glass display tube. For example, used cone glass, which comprises PbO, cannot be used to prepare new screen glass, because PbO causes brown coloration of the display screen during operation of the display tube. For the same reason a mixture of screen glass and cone glass cannot be used to prepare new screen glass. A possible solution would be to separate the screen from the cone, for example, by means of a diamond grinding wheel. After a cleaning treatment, the screen can be recycled to form new screen glass and the cone can be recycled to form new cone glass. However, this method is very laborious.

In European Patent Application EP-A-525226, a description is given of a method of recycling display tubes. A complete display tube is crushed in a crusher and ground into a mixture of glass fragments. Metal parts of the display tube, such as the shadow mask, are removed. The glass fragments are cleaned with water to remove lacquer, phosphors etc. The screen glass and cone glass fragments are sorted out manually, whereafter the sorted types of glass are separately reused. Said document states that up to 10% of used glass fragments are added to the glass melt. A disadvantage of the known method is the time-consuming manual sorting of screen glass and cone glass.

SUMMARY OF THE INVENTION

It is an object of the invention to provide, inter alia, a novel cone glass which can be manufactured from large quantifies (up to 50 wt %) of mixed and crushed cone glass and screen glass originating from used display tubes, i.e. display tubes which are to be recycled, and which novel cone glass comprises only a limited quantity of new raw materials. In addition, the cone glass must have the desired physical and chemical properties. The invention further aims at providing a method of manufacturing such a cone glass by using large quantities of mixed cone and screen glasses originating from display tubes which are to be recycled. The invention further aims at providing a method of manufacturing a cone which is made from such a cone glass.

These objects are achieved by a glass consisting essentially of, in weight percent, the following constituents:

| | |
|---|---|
| $SiO_2$ | >45 |
| $Al_2O_3$ | 2.0–6.5 |
| $Na_2O$ | 4.5–9.0 |
| $K_2O$ | 4.5–9.0 |
| MgO | 0.0–4.0 |
| CaO | 0.0–4.0 |
| SrO | 1.0–7.5 |
| BaO | 3.0–7.5 |
| PbO | 16–24. |

In comparison with the known cone glasses, this novel cone glass in accordance with the invention comprises much more SrO and BaO, which has a favourable effect on the x-ray absorption. In the known cone glasses, the sum of BaO+SrO is maximally 3 wt % owing to the high cost price of the raw material for SrO. The BaO and SrO content in the cone glass in accordance with the invention originates from the screen glass of display tube envelopes to be recycled. The composition of the cone glass is such that the desired physical and chemical properties are obtained and that said cone glass can be manufactured to a substantial degree (up to 50 wt %) from a mixture of glass fragments of screens and cones of display tube envelopes which are to be recycled. For the preparation of this novel type of cone glass, new cone glass fragments and new raw materials, inter alia PbO, and a refining agent such as $Sb_2O_3$, are added to said old glass fragments.

The $SiO_2$ content of the cone glass in accordance with the invention is at least 45 wt %. This $SiO_2$ content leads, in combination with the other constituents, to a glass which can be readily melted and pressed. $SiO_2$ serves as a network former; an $SiO_2$ content below 45 wt % causes the cohesion of the glass and the chemical resistance to be reduced.

$Al_2O_3$ enhances the chemical resistance and the resistance to decay of the glass. Quantities of $Al_2O_3$ below 2 wt % have insufficient effect and lead to an increase of the crystallization tendency of the glass. Quantities in excess of 6.5 wt % lead to an excessive increase of the viscosity and the softening temperature ($T_{soft}$) of the glass, which adversely affects the meltability and processability of the glass.

The alkali oxides $Na_2O$ and $K_2O$ are used as a fluxing agent and reduce the viscosity of the glass. Below the above-stated limits, the reduction of the viscosity is insufficient, whereas above the indicated limits the electrical resistivity and the viscosity decrease excessively.

BaO and SrO predominantly originate from the screen glass to be recycled and a small quantity originates from certain types of used cone glass. A favourable property of BaO is that it causes the electrical resistivity and the x-ray absorption of the glass to be increased and the melting temperature ($T_{melt}$) to be reduced. The lower limit is determined by the glass fragments which originate predominantly from the screens. Above 7.5 wt %, the liquidus temperature ($T_{liq}$) and hence the crystallization tendency increase excessively.

SrO leads to an increase of the x-ray absorption of the glass. The lower limit is determined by the glass fragments which originate predominantly from the screens. Above 7.5 wt %, the crystallization tendency of the glass increases excessively.

It has been found that in the glass in accordance with the invention, SrO and BaO are exchangeable to a substantial degree. By virtue thereof, the composition of the cone glass can be adapted to the available, used screen and cone glasses which are to be recycled.

The other alkaline earth metal oxides MgO and CaO predominantly originate from the glass fragments of the screen and cone glasses to be recycled and have the favourable property that they increase the electrical resistivity and reduce $T_{melt}$. Above the indicated limits, an excessive increase of $T_{soft}$ occurs and the viscosity variation as a function of temperature becomes too steep, as a result of which it becomes more difficult to mould the cone glass.

It is also possible to add an antimony-containing component as a refining agent to the glass composition in accordance with the invention, so that the glass may contain up to 0.3 wt % $Sb_2O_3$. The glass may also contain $Fe_2O_3$, ZnO, $ZrO_2$, $TiO_2$, CoO and NiO as impurities originating from the fragments and raw materials used.

PbO originates, inter alia, from the cone glass to be recycled. An additional quantity of a lead-containing compound, such as red lead, is added to the glass until a minimum content of 16 wt % PbO is attained to meet the x-ray absorption requirement of cone glass ($\mu \geq 65$ cm$^{-1}$ at 0.6 Å). As the lead-containing compound is an expensive raw material, the upper limit of PbO is limited to 24 wt %.

The glass composition in accordance with the invention is very suitable for the manufacture of a cone for display tubes. The glass has the desired physical properties as regards meltability, x-ray absorption, thermal expansion coefficient and electrical resistivity. It also has the desired chemical resistance. A cone having such a glass composition can suitably be sealed, in a customary manner, to a display screen and a neck to form a display tube envelope.

In accordance with the invention, the method of manufacturing cone glass for display tubes essentially comprises the following steps:

crushing into glass fragments the screens and cones which constitute the display tube envelopes to be recycled;

cleaning the glass fragments;

mixing the glass fragments with other glass-forming components and with a refining agent to form a batch;

preparing a glass melt from said batch in a glass furnace.

Crushing of the display tube envelopes to be recycled and the subsequent cleaning of the glass fragments can be carried out, for example, with a device as described in European Patent Application EP-A-525226. Crushers are used to reduce the size of the glass fragments consisting of a mixture of screen and cone glasses to dimensions which are on average smaller than 10 mm. For cleaning the glass fragments use is preferably made of water under high pressure. The cleaning step serves to remove, inter alia, lacquer, graphite and phosphors from the glass. Subsequently, other glass-forming components, such as lead-containing compounds to correct the PbO content, fragments of new cone glass, formed in the production of cone glass, and a refining agent such as $Sb_2O_3$, are added to the fragment mixture. The cone glass in accordance with the invention is manufactured from 35–50 wt % of display tube envelopes to be recycled, 30–45 wt % of new cone fragments and approximately 20 wt % of primary raw materials, such as red lead and feldspar. The mixture is melted in a glass furnace which is known per se. The glass obtained meets, inter alia, the x-ray absorption requirements for cone glass ($\mu \geq 65$ cm$^{-1}$ at 0.6 Å).

The advantage of the cone glass in accordance with the invention resides in that it can be manufactured from 35–50 wt % of used display tube envelopes which are to be recycled, without the necessity of removing the cones from the screens. Consequently, the time-consuming sorting of screen glass and cone glass can be omitted.

The physical properties of the glass are such that a glass cone for a display tube envelope can be pressed in a suitable mould.

It is noted that in German Patent Application DE-A-2358648 a description is given of a glass composition for a neck of a display tube, which comprises up to 7 wt % SrO. However, the glass also comprises a relatively high content of the expensive PbO, namely 30–36 wt %, to obtain a $\mu$ value of at least 100 cm$^{-1}$. The physical properties of said glass are such that it can suitably be used to draw glass tubing from which the necks are manufactured. Said glass is unsuitable for pressing cones.

European Patent Application EP-A-538568 also describes a neck glass having a PbO content of at least 30 wt % to obtain a $\mu$ value of at least 95 cm$^{-1}$.

BRIEF DESCRIPTION OF THE DRAWINGS

The sole FIGURE of the drawing is a schematic, perspective view of a display tube envelope.

EXEMPLARY EMBODIMENT

The FIGURE shows a perspective view of a customary display tube envelope 1 comprising a display screen 2, a funnel-shaped cone 3 and a neck 4. The necks and the electron guns attached thereto are removed from the used display tube envelopes which are to be recycled and which are subsequently crushed into glass fragments having average dimensions below 10 mm. Water under high pressure is used to clean the glass fragments. In terms of weight, approximately ⅓ of this mixture of glass fragments consists of cone glass and approximately ⅔ consist of screen glass. A quantity of 40 parts by weight of said glass fragments are mixed with 40 parts by weight of new cone fragments originating from cone production. Dependent upon the composition of the used display tube envelopes, the mixture obtained may be supplemented with red lead to correct the PbO content, feldspar to correct the $Al_2O_3$ content, and possibly other customary raw materials to obtain the desired composition, and 0.3 parts by weight $Sb_2O_3$.

The batch obtained is melted in a glass furnace and its composition is indicated in the Table under "cone glass in accordance with the invention". The glass composition of a commercially available cone glass is given in the column indicated by "prior-art cone glass".

TABLE

| constituents | composition in wt % | |
|---|---|---|
| | cone glass in accordance with the invention | prior-art cone glass |
| $SiO_2$ | 60.0 | 53.5 |
| $Al_2O_3$ | 5.3 | 5.2 |
| $Na_2O$ | 6.5 | 6.7 |
| $K_2O$ | 7.2 | 7.8 |
| MgO | 0.6 | 0.6 |
| CaO | 1.2 | 1.2 |
| SrO | 1.7 | 0.5 |
| BaO | 5.3 | 0.6 |
| PbO | 20.6 | 23.5 |
| $Sb_2O_3$ | 0.3 | 0.3 |
| rest | <0.3 | <0.1 |
| $10^6 \cdot \alpha_{25-300}$ | 9.9 | 9.9 |
| $T_{strain}$ (°C.) | 456 | 435 |
| $T_{ann}$ (°C.) | 488 | 470 |
| $T_{soft}$ (°C.) | 662 | 655 |
| $T_{work}$ (°C.) | 982 | 990 |
| $T_{melt}$ (°C.) | 1420 | 1470 |
| $T_{k100}$ (°C.) | 320 | 305 |
| $\log(rho)_{250}$ | 9.4 | 9.1 |
| $\log(rho)_{350}$ | 7.5 | 7.2 |
| $T_{liq}$ (°C.) | 870 | 860 |
| s.w (kg/dm³) | 3.06 | 2.99 |
| $\mu$ (cm⁻¹) | 65.9 | 66.0 |

The symbols used in this Table have the following meaning:

$\alpha_{25-300}$: average expansion coefficient between 25° C. and 300° C.

$T_{strain}$ (°C.): temperature at which $\eta$ (viscosity)= $10^{14.5}$dPa.s, termed low annealing temperature.

$T_{ann}$ (°C.): temperature at which $\eta=10^{13.0}$dPa.s, termed high annealing temperature.

$T_{soft}$ (°C.): temperature at which $\eta=10^{7.6}$dPa.s, termed softening temperature.

$T_{work}$ (°C.): temperature at which $\eta=10^{4.0}$dPa.s, termed working temperature.

$T_{melt}$ (°C.): temperature at which $\eta=10^{2.0}$dPa.s, termed melting temperature.

rho (ohm.cm): electrical resistivity.

$T_{k100}$ (°C.): temperature at which rho=$10^8$ ohm.cm.

$\log(rho)_{250}$: logarithm to the base 10 of rho at 250° C.

$\log(rho)_{350}$: logarithm to the base 10 of rho at 350° C.

$T_{liq}$ (°C.): temperature above which the glass no longer crystallizes.

s.w. (kg/dm³): specific mass.

$\mu$ (cm⁻¹): x-ray absorption at 0.6 Å.

The physical properties of the glass composition in accordance with the invention are comparable to those of a conventional cone glass. In particular the BaO content and SrO content are much higher than usual. These two components originate predominantly from screens of display tube envelopes which are to be recycled. The waste problem is reduced considerably by recycling these used display tube envelopes to form new cone glass.

We claim:

1. Glass for a cone of a display tube, which consists essentially of, in weight percent, the following constituents:

$SiO_2$>45

$Al_2O_3$ 2.0–6.5

$Na_2O$ 4.5–9.0

$K_2O$ 4.5–9.0

MgO 0.0–4.0

CaO 0.0–4.0

SrO 1.0–7.5

BaO 3.0–7.5

PbO 16–24.

2. A glass cone particularly adapted for use in a display tube, said glass consisting essentially, in weight percent, of the following ingredients:

| | |
|---|---|
| $SiO_2$ | >45 |
| $Al_2O_3$ | 2.0–6.5 |
| $Na_2O$ | 4.5–9.0 |
| $K_2O$ | 4.5–9.0 |
| MgO | 0.0–4.0 |
| CaO | 0.0–4.0 |
| SrO | 1.0–7.5 |
| BaO | 3.0–7.5 |
| PbO | 16–24. |

3. A display tube comprising a glass cone, the glass of said cone consisting essentially, in weight percent of the following ingredients:

| | |
|---|---|
| $SiO_2$ | >45 |
| $Al_2O_3$ | 2.0–6.5 |
| $Na_2O$ | 4.5–9.0 |
| $K_2O$ | 4.5–9.0 |
| MgO | 0.0–4.0 |
| CaO | 0.0–4.0 |
| SrO | 1.0–7.5 |
| BaO | 3.0–7.5 |
| PbO | 16–24. |

* * * * *